United States Patent [19]

Peters

[11] 4,174,889

[45] Nov. 20, 1979

[54] TRAVEL MONITOR

[75] Inventor: Arnis E. Peters, LaCrosse, Wis.

[73] Assignee: Northern Engraving Company, Sparta, Wis.

[21] Appl. No.: 847,257

[22] Filed: Oct. 31, 1977

[51] Int. Cl.$^2$ .................. G03B 21/11; G03B 23/12
[52] U.S. Cl. ................................ 353/12; 353/78; 353/119; 353/26 R
[58] Field of Search .................. 353/11, 12, 13, 38, 353/74–78, 122, 119, 26 R, 26 A

[56] References Cited

U.S. PATENT DOCUMENTS

| | | | |
|---|---|---|---|
| 2,700,917 | 2/1955 | Peters et al. | 353/78 |
| 2,782,680 | 2/1957 | Howell | 353/78 |
| 3,319,517 | 5/1967 | Rondas et al. | 353/78 |
| 3,359,408 | 12/1967 | Briggs | 353/12 |
| 3,561,860 | 2/1971 | Rudolph | 353/77 |
| 3,586,430 | 6/1971 | Rempala | 353/26 R |
| 3,739,069 | 6/1973 | Sandmeier | 353/77 |
| 3,744,893 | 7/1973 | Chandler | 353/75 |
| 3,826,579 | 7/1974 | Schurgin | 353/12 |
| 3,848,980 | 11/1974 | Plummer | 353/77 X |
| 3,920,322 | 11/1975 | Peters | 353/26 R |
| 3,950,086 | 4/1976 | Schulman et al. | 353/119 |
| 3,985,430 | 10/1976 | Steiner | 353/119 X |

FOREIGN PATENT DOCUMENTS 324395  1/1930  United Kingdom ............. 353/12

Primary Examiner—Harry N. Haroian
Attorney, Agent, or Firm—Norman Lettvin

[57] ABSTRACT

A microfilm viewing monitor, that is adapted to illuminate and enlarge microphotographic material and display images thereof on a viewing screen, is provided for use in environments that include substantial ambient light. The monitor includes an improved illumination-display system in which the viewing screen comprises a two-element sandwich, including a Fresnel lens for receiving and converging illuminated image bearing light rays with a semi-specular lens for diffusing and focusing those rays, and an image enhancing lens positioned forwardly of the viewing screen operates to reduce the effect of ambient light, thereby providing for improved image resolution. For further image enhancement, the lens may be tinted, and cooperates with housing walls to provide a hood-like effect forwardly of the viewing screen. The viewing monitor preferably is for use in a motor vehicle, and may be arranged to assist the vehicle operator with route navigation. When so employed, the monitor is pivotly mounted for selective universal positioning, so as to be clearly viewable by the operator while he controls the movement of the vehicle.

6 Claims, 4 Drawing Figures

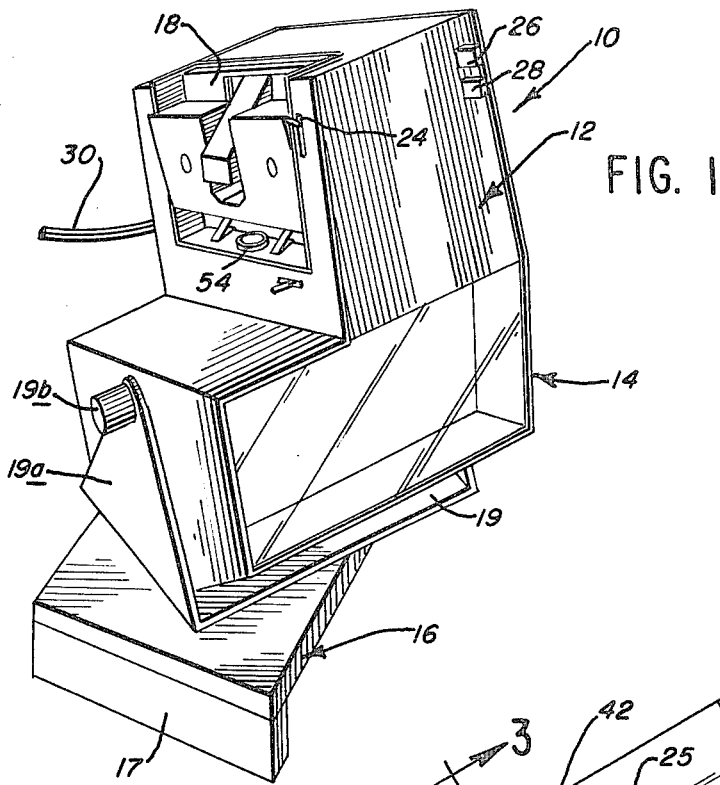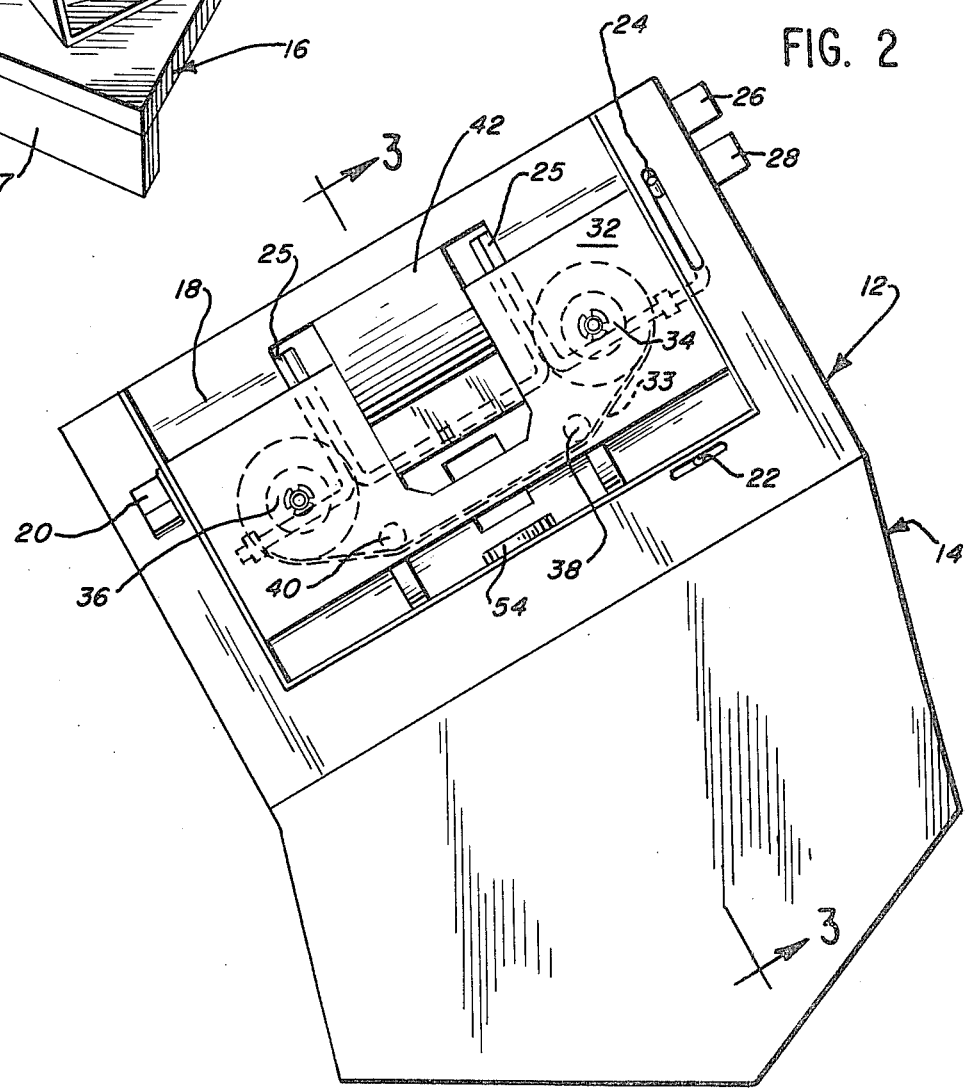

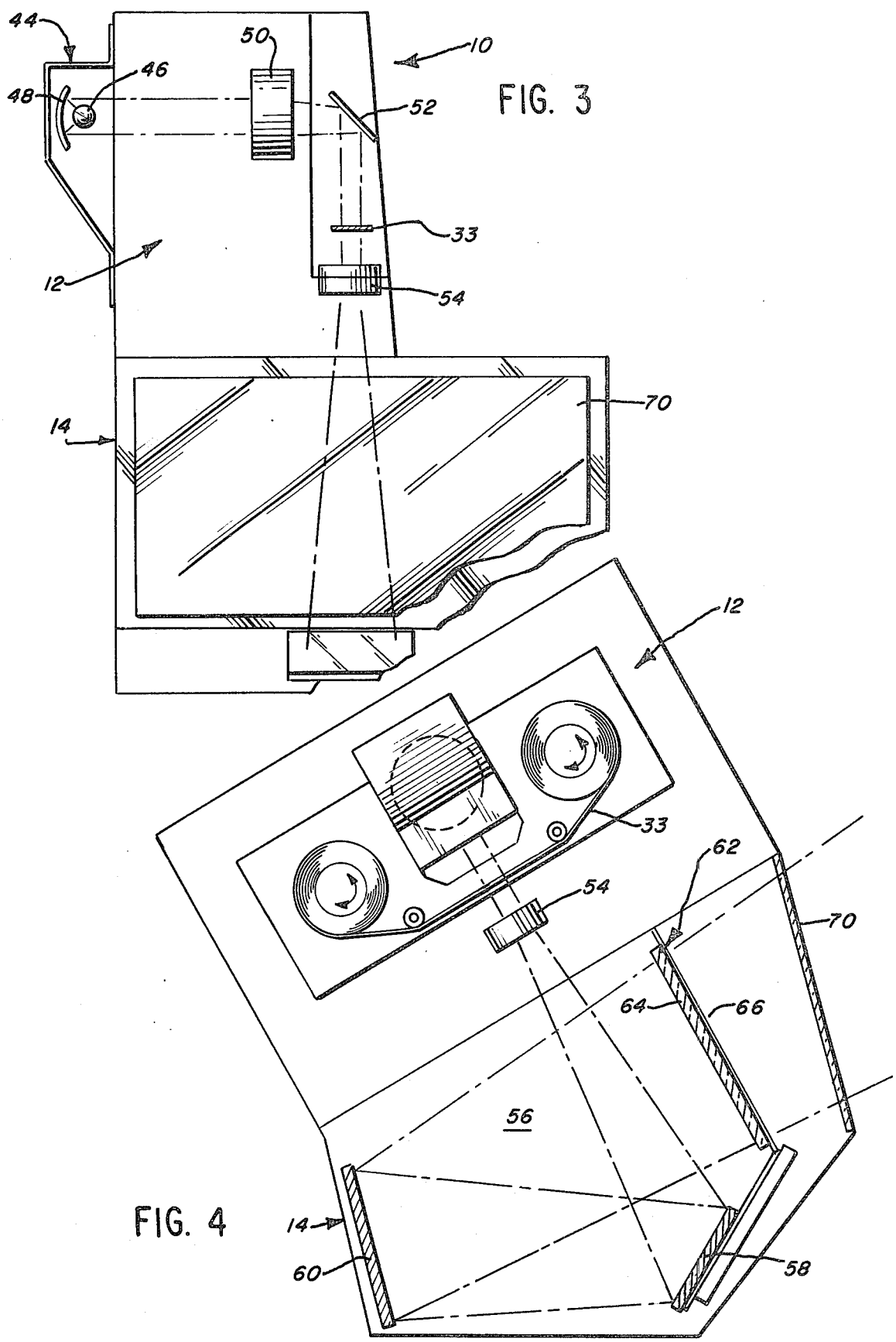

TRAVEL MONITOR

FIELD OF THE INVENTION

This invention relates to a microfilm viewing device specially adapted for motor vehicle use, and more particularly, to an improved microfilm viewing monitor for illuminating, enlarging and displaying selected frames of cassetted microfilm with a high quality of image resolution.

BACKGROUND OF THE INVENTION

Viewing devices for illuminating and enlarging microphotographic material provided on cassetted microfilm strips are known in the art, including U.S. Pat. Nos. 3,844,642 and 3,920,322. A motorized drive with both fast and slow forward and reverse movement of film for locating a particular frame of the cassetted film for illumination and viewing is also known in U.S. Pat. No. 3,920,322. The cassetted film may be enclosed in a projection chamber means which includes an intense light source and a projection lens as in the said patents, or the cassetted film may be located in an exposed condition as appears from U.S. Pat. No. 3,523,657. In prior constructions, with the presently known exception illustrated in FIG. 10 of U.S. Pat. No. 3,319,517, the optical axes of the light source, lens, all reflective mirror means and viewing screen of the viewing device are located in a single geometrical plane, which operates to limit the applicability of such viewing devices.

In the present invention, the path from the light source to the projection lens may be located in a plane that differs from the plane defined by light projection, or optical, axes after light leaves the projection lens, and this provides a desirable flexibility for usage of a micro image viewer. The light in the instant invention is projected from a source against a mirror, which mirror turns the light approximately 90° to pass through a selected portion of the film in the cassette, and then through a projection lens to strike second and third direction-changing mirrors prior to impinging upon the illuminated viewing screen.

Previous viewers of cassetted microfilm suffered a common shortcoming that frequently the final viewing image of the selected microfilm portion lacked sufficient resolution to be clearly and easily distinguishable, particularly in an environment having a high intensity of ambient light.

The present invention, being a monitor primarily intended for use in motor vehicles, will be subject to bright ambient light. If the light were permitted to affect image resolution, the motor vehicle driver would be hampered in attempts to simultaneously read the monitor and exercise full and safe control over his vehicle.

It is accordingly one object of the present invention to provide a microfilm viewing monitor having an improved microfilm projection system, such that the clarity and resolution of the image are not affected by bright ambient light.

It is a further object of this invention to provide a microfilm viewing monitor of flexibility in use, specially adapted for mounting in motor vehicles so as to be readily viewable by the vehicle's driver.

These and other objects and advantages of the invention will become clear from the following description of a preferred embodiment of the invention.

BRIEF SUMMARY OF THE INVENTION

An improved illumination-display system for a microfilm viewing monitor is disclosed herein. A novel viewing screen is provided, which screen comprises a two-element sandwich including a Fresnel lens for receiving and converging illuminated image-bearing light rays and a semi-specular lens for diffusing and focusing those rays. The system further includes an outer tinted, transparent, image-enhancing lens which covers the viewing screen and cooperates with the inner walls of the monitor housing to reduce the introduction of ambient light, thereby improving image resolution. The monitor is specially adapted for installation in a motor vehicle where it may be employed with a microfilmed cassette bearing geographical route information to assist motor vehicle navigation. The installation includes mounting for universal movement to afford the vehicle driver clear vision of the viewing screen.

BRIEF DESCRIPTION OF THE DRAWINGS

FIG. 1 is a perspective view of one form of a microfilm viewer constructed in accordance with the present invention, in a position of use, and showing the microfilm cassette in its operative position;

FIG. 2 is a side elevational view of the microfilm module and housing of this invention, taken looking from the left of FIG. 1, and showing the reels and microfilm in the interior of the cassette in phantom view;

FIG. 3 is a fragmentary, cross-sectional view, taken substantially along line 3—3 of FIG. 2, with the rear portion of the housing omitted to show the interior of the micro-film viewer of this invention; and FIG. 4 is a cross-sectional view, taken in a direction similar to that of FIG. 2, but showing the optical path that includes the disposition of mirrors and image-enhancing system, mounted within and on the viewing screen housing.

DETAILED DESCRIPTION OF THE DRAWINGS

The microfilm viewing monitor of the present invention is generally depicted at 10 in the drawings. As shown in FIG. 1, it includes an upper microfilm cassette receiving module 12, an intermediate viewing screen housing 14 and a lowermost vehicle mounting stand 16.

The upper cassette receiving module 12 is generally rectangular in shape with one side thereof having a cassette receiving recess 18. Referring primarily to FIG. 2, various cassette operating controls are positioned about the cassette receiving recess so as to be easily manipulated by the monitor user. A rocker-type on-off switch 20 is located to the upper left of the recess 18. A focus control lever 22 is provided on the housing adjacent the projection lens that it is to control. An angled cassette ejection lever 24 is positioned on the right-hand side of the recess to operate to move a pair of cassette engaging arms 25 into engagement with the cassette 32. Additionally, controls, such as 26 and 28, are supplied for controlling the direction and speed of the film transport system. Such controls and the wiring for the drive are fully described in U.S. Pat. No. 3,920,322.

An electrical cord 30 supplies power from a source to the monitor. In the preferred embodiment, the monitor is adapted for use in a motor vehicle, in which case, the cord 30 draws power directly from the battery or by being plugged into a power receptacle, such as the cigarette lighter. Of course, when the monitor is used in more conventional environments, power can be drawn from an electrical outlet.

The cassette 32 is hollow and includes therein a pair of reels 34 and 36 which are constructed to be rotated about parallel but spaced axes. A pair of alignment rollers 38 and 40 are also provided so that the film 33 trained thereover will be located at a position intermediate the walls of the bight portion of the cassette 32. The cassette 32 is substantially that shown and described in U.S. Pat. No. 3,844,642.

The cassette module 12 includes a hood-like, projection 42 extending outwardly from the recess 18, and embracing means for changing the direction of a projected light. Projection 42 is cooperatively associated with the positioning of cassette 32 in the recess 18. The opposite side of the cassette module 12 includes a projection 44 (see FIG. 3) that encloses a light source.

A cassette-receiving and film-illuminating means includes the recess 18 in one wall of module 12, and a source of intense light, such as bulb 46, housed within the projection 44. A concave reflecting mirror 48 for reflecting light is positioned adjacent the bulb 46 in projection 44. The light emanating from the bulb 46 is directed forwardly toward the cassette receiving side wall of the module 12. Linearly aligned with, but spaced from, the bulb 46 is a light ray collimating lens 50 which directs the light rays from bulb 46 and reflector 48 to turning mirror 52 within hood-like projection 42. The turning mirror reflects the light rays downwardly through an opening in the bight portion of the cassette 32 to illuminate a selected frame of the microfilm.

A projection lens 54 is spaced below the turning mirror 52 a sufficient distance to define a projection space and enable entry and removal of the cassette, and its bight, such that the selected portion of the filmstrip extending through the bight is properly positioned in the projection space.

The projection lens 54 projects the illuminated image rays from the cassette module 12 into the viewing screen housing 14. The interior of the viewing screen housing 14 defines an enclosed reflecting chamber 56 shielded from ambient light. Second and third turning mirrors 58 and 60 are rigidly mounted within the chamber 56 and direct the impinging image rays from the projecting lens 54 onto the back surface of a planar viewing screen 62. The viewing screen 62 is a two-element sandwich whose back side is a Fresnel lens 64 for receiving and converging the illuminated image rays, and whose front side is a semi-specular lens 66 for diffusing and focusing the image rays received from the Fresnel lens.

Since Fresnel lenses are well known, it will suffice to note that they have the characteristic of redirecting diverging rays to converge at a point spaced from the viewing screen. They usually are stepped, i.e., have concentric, circular steps formed in one surface arranged to form a very thick transparent plate.

The second, or front, part of the screen sandwich, the semi-specular lens, preserves the resolution of the image and prevents distortion. By placing the semi-specular lens as close as possible to the Fresnel lens, the converging rays emanating from the Fresnel lens will be diffused.

The optical axes of the projection lens 54, and the mirrors 58 and 60, lie in an image projection plane which differs from the light ray plane defined by the source of light 46, collimating lens 50 and turning mirror 52. This provides desirable flexibility for usage of the monitor. The image projection plane is fixed relative to the light ray plane. Although the lens 54 may be slightly movable along an axis for the purpose of focusing, the lens always lies within the image projection plane.

The front portion of the viewing screen housing 14 forwardly of viewing screen 62 is provided with an opening through which the front side of the viewing screen 62 is viewed. An image enhancing means 70, in the form of a transparent lens, tinted for filtering out ambient light, covers the opening in housing 14 forwardly of screen 62. The lens 70 is inclined, preferably downwardly and rearwardly, to avoid parallelism with screen 62 to avoid internal reflection. It will be understood that many variations in the color and material of the image enhancing lens 70 are possible without departing from the spirit and scope of the invention. However, a bronze color and Plexiglas material have been found to present excellent image resolution.

When viewing the monitor 10, the illuminated image is not seen on the image enhancing lens 70, but rather on the semi-specular lens 66, which is spaced rearwardly of lens 70. Experimentation has shown that for the best effect, the image enhancing lens 70 should be spaced at its closest point to viewing screen 62, which is at the lowest edge in the form shown, at least one-half inch forwardly of the semi-specular lens 66. This provides a desirable hood effect because the lens spacing, the black interior of the housing's side walls, and the angled image enhancing lens 70 cooperate to inhibit exterior ambient light from "washing out" the image obtained on the viewing screen 62.

The viewing monitor 10 may be specially adapted for use in motor vehicles, such as automobiles. When intended for such use, the lower vehicle mounting stand 16 is employed such that stand legs 17 straddle opposite sides of the raised drive train tunnel existing in the interior of the vast majority of automobiles. Pivotably connected to the stand 16 for rotation about a vertical axis is a monitor cradling frame 19. The upright legs 19a of the frame 19 pivotably hold the monitor for rotation about a horizontal axis via a pair of oppositely disposed pivot pins 19b. Because the monitor can be selectively pivoted about vertical and horizontal axes of rotation, the driver of the motor vehicle is able to universally adjust the monitor for viewability.

Operation

When used in a motor vehicle, the driver of the vehicle or a passenger adjacent the driver can pivot the monitor about its horizontal and vertical axes until he can easily see the viewing screen 62. He then operates the controls located about the recess 18 to bring a selected microfilmed frame into focused view. That accomplished, he is then able to view the selected frame in an enlarged and illuminated condition. Owing to the improved lens and mirror magnification system and the improved light path, the driver views the image with a high degree of resolution and without the interference of ambient light.

The light rays follow a path originating at the source of light 46. Light rays therefrom are reflected from the concave mirror 48 through the light ray collimating lens 50 and are directed to impinge upon the first turning mirror 52. The mirror 52 changes the direction of the light rays by approximately 90° so as to enable the rays to pass through the film in the cassette 32. From the film, the light rays, now bearing the image of the film through which they passed, are directed downwardly through the projection lens 54. The image rays enter the viewing screen housing 14 in which they reflect off of the second and third spaced turning mirrors 58 and 60 so as to impinge on the viewing screen sandwich 62. The image rays are received by the Fresnel lens 64 and converged thereby. They then pass through the semi-specular lens 66 which diffuses and focuses the rays for final viewing. Reduction of ambient light interference with the final image is effected by the bronze, Plexiglas lens 68, that is also angled relative to the viewing screen and when acting in cooperation with the black interior housing walls.

While one form of the invention has been described, it will be understood that the invention may be utilized in other forms and environments, so that the purpose of the appended claims is to cover all such forms of devices not disclosed but which embody the invention disclosed herein.

What is claimed and desired to be secured by Letters Patent of the United States is:

1. In a viewing device that provides an illuminated enlarged display of a microimage, that has been selected from an elongated film strip which carries such images and is selectively moveable within a cassette between spaced reels carried within said cassette;

the improvement of such a viewing device for use within an automotive vehicle, comprising in combination:

the viewer including housing means; illuminating means including a light source and light collimating means, enclosed within said housing means and for directing and collimating light from said light source along a first optical axis, means for directing the collimated light through a selected portion of the film and the cassette therefor, and optical projection means, including lens means, mirror means, and a two element viewing screen sandwich that includes a Fresnel lens, in said housing means and for receiving the light that has passed through the film for passage through said lens means, along a second folded optical axis that lies in a projection plane that is transverse to said first axis, against spaced mirrors to effect enlargement of the illuminated image and to project said enlarged image onto said two-element viewing screen sandwich that includes a Fresnel lens;

said housing means being shaped and constructed to provide, on the exterior of said housing means, an open sided recess that is edge-bounded by portions of said housing means and which is adapted to receive thereinto a cassette, said recess being aligned both with said first axis and with said projection plane;

hooded light turning means on said housing means positioned within the confines of said recess for directing light from said illuminating means into said projection plane, said hooded means and the edge boundaries of the recess cooperating to provide a shaped recess for receiving thereinto a film-carrying cassette that is shaped to cooperate with said recess and hooded light turning means so as to be received and held in the recess at a pre-determined attitude, with a selected portion of the film strip positioned between said light turning means and said projection means, said arrangement permitting a person to selectively load a cassette into the viewer without opening the viewer; and means carried by the housing means and operatively associated with the reel-mounted film strip, when the cassette is operatively positioned within said recess, for selectively moving the film strip transversely of said second optical axis, whereby the enlarged display of microimages from said film strip may be viewed by a person controlling the vehicle for purposes of selecting a course for said vehicle from said enlarged display.

2. A viewing device as in claim 1 wherein the projection means includes a two-element viewing screen sandwich consisting of a rearwardly positioned Fresnel lens means for receiving and converging illuminated image rays, and a forwardly positioned semi-specular lens for diffusing and focusing the image rays from the Fresnel lens means, and an image enhancing means, for reducing the effect of ambient light entering the vehicle, positioned forwardly of said two-element sandwich.

3. A viewing device as in claim 2 wherein the image enhancing means includes a tinted transparent lens angled relative to, and spaced forwardly of, said two-element viewing screen sandwich, and side walls of said housing means projecting forwardly of the viewing screen, and located outwardly of the optical projection of the viewing screen, and constructed to hold the angled lens, and to provide a hood, for excluding ambient light, that extends between said screen sandwich and said tinted transparent lens.

4. A viewing device as in claim 3 wherein the tinted transparent lens is a bronze-tinted Plexiglas sheet.

5. A viewing device as in claim 2 wherein the housing means is supported for selective pivoting thereof about a pair of axes lying in planes perpendicular to each other, to permit selective positioning of the attitude of the viewing screen of the projection means within the vehicle.

6. A viewing device as in claim 5 wherein said housing means and said support for selective pivoting of said housing means are carried upon a mounting stand that is shaped to straddle a raised drive train tunnel that may be provided in the interior of the vehicle.

* * * * *